United States Patent [19]

McCloskey

[11] Patent Number: 4,613,309

[45] Date of Patent: Sep. 23, 1986

[54] FIGURES OF SPEECH

[76] Inventor: Emily A. McCloskey, P.O. Box 187, 103 Wayne St., Claysville, Pa. 15323

[21] Appl. No.: 777,730

[22] Filed: Sep. 19, 1985

[51] Int. Cl.<sup>4</sup> .............................................. G09B 1/34
[52] U.S. Cl. .................................... 434/170; 434/171
[58] Field of Search ................................ 434/170, 171

[56] References Cited

U.S. PATENT DOCUMENTS

| | | | |
|---|---|---|---|
| 2,520,647 | 4/1947 | Northrup | 434/171 |
| 3,235,976 | 2/1966 | Elliott et al. | 434/170 |
| 3,333,351 | 8/1967 | Williams | 434/171 |
| 3,389,480 | 6/1968 | Holland | 434/170 X |
| 3,482,333 | 12/1969 | Trager, Jr. | 434/170 X |
| 3,728,800 | 4/1973 | Magram | 434/171 |
| 3,798,797 | 3/1974 | Mandel | 434/171 |
| 3,903,617 | 9/1975 | Evans | 434/171 |
| 4,044,476 | 8/1977 | Marsh | 434/171 |
| 4,422,642 | 11/1983 | Fletcher | 434/170 X |
| 4,478,582 | 10/1984 | Tucker | 434/170 |

Primary Examiner—William H. Grieb
Attorney, Agent, or Firm—Patricia Kuker Staub

[57] ABSTRACT

An educational model for teaching language grammar, parts of speech, syntax, and sentence structure is disclosed in which thirty (30) individual elements of speech are identified and grouped into ten (10) distinct sets which are embodied in physical models. Each model represents a word or group of words, referred to as "elements," which form the logical building blocks of the language. Certain elements are actually hybrid elements in that they reflect the unique properties and derivations of verbals, phrases and clauses. The models interengage with one another without fully interlocking, in order to designate, simultaneously, each element's part of speech and part of sentence within the sentence. Each model is generic in that it does not impose case or agreement of person and number or predetermined word choices on the word or group of words it designates. Case is determined only by the position of each element as it interengages with other elements. Symbols are used to designate the function of each element; color is used to designate the element's set, and shape is used to designate sentence part and part of speech. The user interengages each element with other elements to form a phrase, clause, or sentence as an alternative to conventional sentence diagramming. The models may be embodied in print, plastic, video, or software.

6 Claims, 57 Drawing Figures

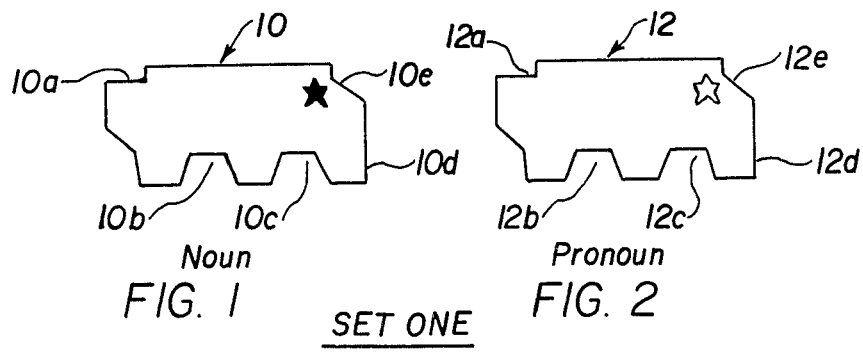
Noun — FIG. 1    Pronoun — FIG. 2
SET ONE
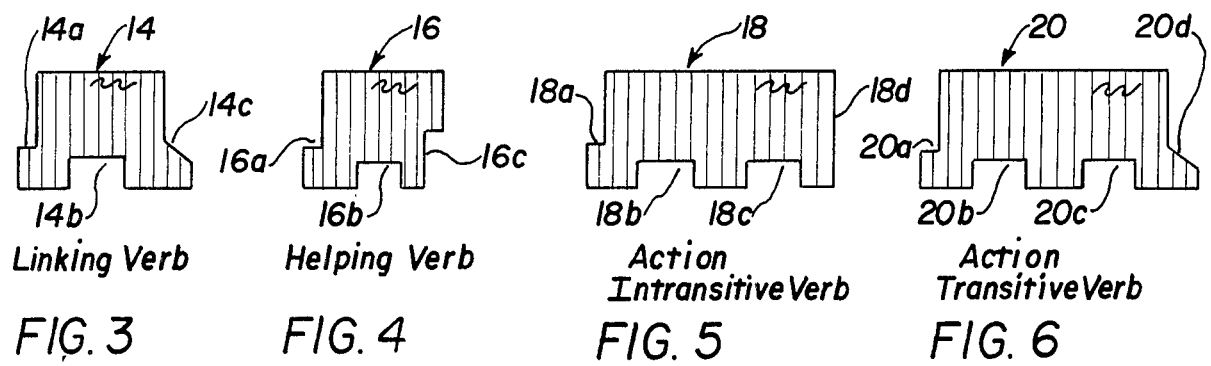
Linking Verb FIG. 3    Helping Verb FIG. 4    Action Intransitive Verb FIG. 5    Action Transitive Verb FIG. 6
SET TWO
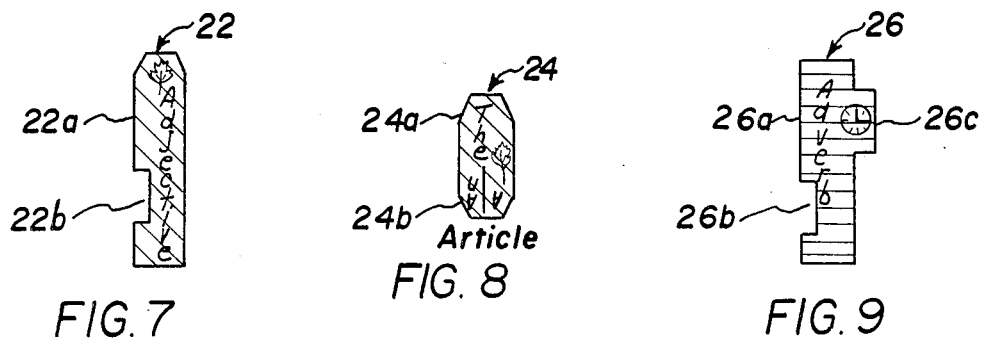
FIG. 7    Article FIG. 8    FIG. 9
SET THREE         SET FOUR
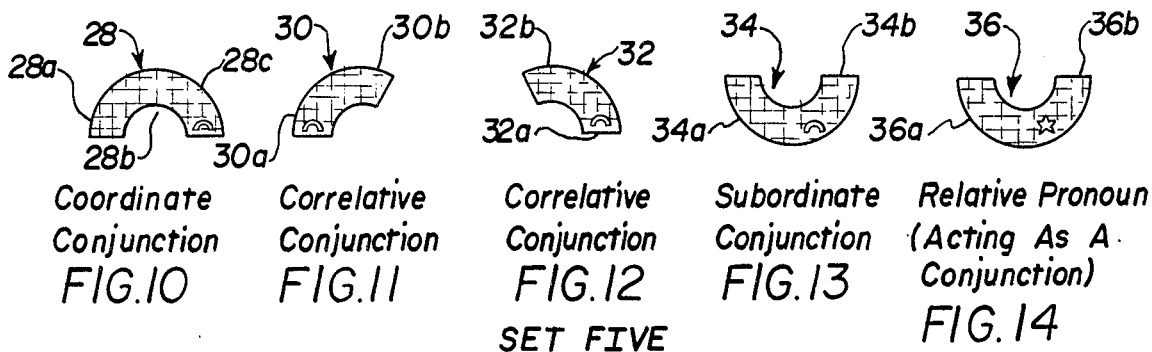
Coordinate Conjunction FIG. 10    Correlative Conjunction FIG. 11    Correlative Conjunction FIG. 12    Subordinate Conjunction FIG. 13    Relative Pronoun (Acting As A Conjunction) FIG. 14
SET FIVE Interjection Expletive Nominative Absolute Independent Elements

SET SIX

SET SEVEN

SET EIGHT

Noun Clause Being Introduced By Subordinate Conj.

Noun Clause Being Introduced By Relative Pronoun

SET NINE

Adjective Clause Introduced By Subordinate Conj.

Adjective Clause Introduced By Relative Pronoun

Adverbial Clause Introduced By Subordinate Conj.

SET TEN

FIGURES OF SPEECH

This invention relates to a new and improved apparatus and method for teaching grammar and syntactical skills to language students. More specifically, this invention allows a student to learn and use complex grammatical rules and constructions at an early age through the use of physical models representing "elements" of the language. This method, which is meant to function as an alternative to traditional sentence diagramming in the classroom, depends on the use of physical models to conceptualize abstract grammatical concepts. It also depends on the arbitrary grouping of language "elements" into sets of models based upon a similarity of element characteristics within each set.

No other system has utilized such a unique grouping of elements and combined it with a sophisticated coding-system employing color, symbol, shape, and sequencing of models, in order to describe such fundamental language concepts as parts of speech, hybrid parts of speech, parts of sentence, and case. Prior devices and methods for instructing students in grammar have been disclosed, such as U.S. Pat. Nos. 2,520,649, 3,333,351, 3,728,800, 4,044,476, and 4,478,582. These methods, however, while representing an improvement over the often unsuccessful traditional approach to grammar, i.e. sentence diagramming, have also presented serious drawbacks to their widespread use in the classroom.

One such defect of prior art, has been an attempt to superimpose a predetermined case upon each model through its shape, as if case were an inherent property of that element of speech. This invention teaches the fact that case, with the exception of a few pronouns, is never an inherent property of an element; case can normally be ascertained only after the sentence is formed. For example, a noun can be either the subject or direct object of a sentence, taking on either the nominative or objective case, but the student is not able to determine which case the noun has assumed until after viewing the complete sentence. Therefore, since the imposition of case upon a physical model can become restrictive and confusing, this system utilizes rules of positional analysis, instead, to determine, the case of each element, only after the sentence is constructed.

Another deficiency of prior art has been to limit grammar models to three-dimensional "blocks", (U.S. Pat. No. 3,728,800, restrictive sentence "frames," U.S. Pat. No. 2,520,649, or "puzzle shapes" which form a rectangle when properly assembled (U.S. Pat. No. 4,422,642). The common defect of all of these prior methods is that only predetermined sentence patterns utilizing a limted vocabulary can be utilized. In the case of frames, no allowance is made for an interruption between subject and predicate by the addition of appositives and the like, and in the case of puzzles and blocks, the inherent inflexibility of these forms does not lend itself to expression of the wide variety of speech elements and sentence constructions.

Another major defect of prior art has been to make interlocking models of speech parts that will not mate unless the sentence is correctly constructed. Thus, the student deduces, only from the completed puzzle, after the fact, that the sentence is grammatically correct; he does not use his inductive reasoning to construct the shape of the sentence, himself. This invention, on the other hand, utilizes models to interengage without restriction in more than one correct manner, so that the student actually "creates" a sentence whose pieces do not totally interlock, but partially interengage to cooperate. The prior systems which depend on the means of interlocking the elements to afford only one correct manner of engagement are unduly restrictive and limited because the student may learn how to assemble the puzzle without learning for what purpose the puzzle is actually being assembled.

Perhaps the most serious drawback of prior art, however, has been the limitations imposed on the number of previous "elements" of speech. Traditional grammar, as mirrored by prior art, teaches that there are eight distinct parts of speech which make up the "elements" of language. The present system, however, recognizes that there are also additional elements of speech aside from the traditional eight parts of speech which form the building blocks of language. This system incorporates thirty (30) distinct figures into its system, and groups them into ten (10) distinct sets based on the similarity of elements within each set. This system actually creates models for "hybrid" parts of speech by combining shapes and colors of specific speech parts to form naturally-occuring participles, gerunds, infintives, noun clauses, infinitives, and the like.

Only in this system, is the true melding of speech parts made apparent, through the use of hybrid elements. Suddenly a new teaching tool is available for the construction of varied sentences which utilize participles, such as: "The speeding boat raced." Sentences using infinitives as subjects, such as "To dance is my desire." can be constructed; the construction of sentences using noun clauses as subjects are also now available: "That John likes pizza is pure fact."

As a further benefit, each student can now learn to recognize the similarity of properties among the myriad of individual speech elements by recognizing the relationship between each element's color-coded "set" designation and that element's shared relationship to other elements in the language. When the student sees the color red, he thinks of an element sharing verb or verb-like characteristics. When he sees the color white, he thinks of an element sharing noun or noun-like characteristics. When he sees a red and white hybrid form, representing a gerund element, he realizes that the gerund is a word composed of part noun and part verb, and belongs to the set of verbal elements, with a verb becoming designated as subject, or direct object.

Therefore, the partial interengagement of pieces represents a significant novelty in itself, since the models of prior systems which either totally interlocked in one correct position, or were restricted in construction through the use of an inflexible artificial framework, necessarily limited the number of possible sentence constructions.

OBJECTIVES OF THE INVENTION

The primary objective of this invention is to provide a method of sequential instruction for students of all ages utilizing physical models in order to conceptualize parts of speech and other fundamental language elements. This system is meant to be used as an alternative to sentence diagramming in the classroom. Its application is meant to extend to handicapped and pre-school students, and those with limited reading skills and/or concentration.

Another objective of this teaching system is to integrate the learning of more sophisticated concepts of verbals, infinitives, clauses, and phrases, with the early learning of parts of speech. Another objective is to divide all elements of the language into ten (10) unique sets which are identified by color, in order that students can attain a total comprehension of the manner in which similar language units work together in order to construct a sentence.

It is a further objective of this system to enable the student to learn the underlying grammar of the language at the time the sentence is being constructed rather than afterwards, as in traditional diagramming and in prior art. This system has the further objective of being so completely flexible in its use that virtually any sentence can be constructed through this method. Therefore, this invention can be used effectively to teach sentence variety and vocabulary skills in writing.

Another objective of this system is to provide an enjoyable video format for teaching grammar to children. A further objective of this system is to utilize this apparatus in the study of the foreign languages so that similarities and differences in grammar become immediately apparent to students already trained in this system.

SUMMARY OF INVENTION

Grammar has always been one of education's most unloved subjects; nevertheless, a complete understanding of grammar is essential for learning everyday language and writing skills. More specifically, without an understanding of parts of speech and how they relate to other language elements to form phrases, clauses, and sentences, the student becomes confused and overwhelmed as he continues to study the language.

Traditional methods of sentence diagramming commonly used to teach grammar and syntax, have failed to provide the necessary background knowledge that students need. The reason for this failure is that grammatical concepts are too abstract for most students to grasp without visual or concrete embodiments. At best, the average student gets a sketchy idea of what he needs to know, and that is usually accompanied by a great dislike for the subject. As students pass from grade to grade, their frustration mounts as they are confounded by a variety of individual approaches used to circumvent this problem.

The need is clear for a new method of teaching grammar which is simplified, colorful, easily-understood, and consistant. The ideal system should additionally be sophisticated and flexible enough to be used in teaching a wide range of language skills at all levels. Additionally, such a system should be susceptible to embodiment in a wide variety of modern formats such as graphics, video, and software, as well as in the classic three-dimensional physical models. The present invention, through the use of color, shape, and symbol-coded physical models, representing parts of speech and other language elements, provides such a system.

One of the major problems inherent in conceptualizing abstract grammatical concepts is the inability of the student to ascertain how individual speech elements relate to one another in order to form sentence parts. The present invention overcomes this problem by providing thirty (30) distinct speech elements which are divided into ten (10) color-coded sets based on the similarity among elements within each set. Contained within the first seven sets are the eight basic parts of speech, and included in the remaining three sets are hybrid forms such as verbals, phrases and clauses.

This system is unique in that it recognizes the need to group speech elements into sets comprising all the basic elements of speech in addition to the eight basic parts of speech. Only at advanced levels does traditional grammar introduce hybrid elements such as verbals, verbal phrases, and subordinate clauses. This system, on the other hand, provides easily-recognizable models for these hybrid parts of speech including participles, gerunds and infinitives. For example, the shape of the participle model embodies aspects of the adjective combined with the verb form as does the participle itself. The shape of the gerund model combines aspects of the noun and the verb form in a single element, as does the gerund, itself.

The elements contained within each of the above-mentioned ten (10) sets have been grouped according to the inherent similarities among the members of each set. Set One contains nouns and pronouns; Set Two contains verb elements; Set Three contains adjectives and the article; Set Four contains the adverb; Set Five contains conjunctions and conjunction-like elements; Set Six contains independent elements; Set Seven contains prepositions; Set Eight contains prepositional phrase elements; Set Nine contains clause elements; and Set Ten contains verbal elements. Each set has been assigned a unique color scheme which clearly identifies its elements.

Each element bears a symbol on its face representing the function of each element as traditionally defined. For example, nouns bear the symbol of a star, to designate that their function is to name things; pronouns bear a similar hollow star to designate that their traditional function is to substitute for a noun which names things. Verbs bear the symbol of a wave to indicate their function as action-words; adjectives bear a leaf to designate their function as descriptive words. Adverbs bear a clock to indicate that their function is to tell when or where a verb acts. Conjunctions bear a bridge symbol to indicate that they connect words or phrases. Independent elements bear an exclamation mark to indicate they they stand alone from the sentence. Prepositions bear a double-sided arrow to indicate that they show the relationship between a noun element and another word in the sentence. Clausal elements and phrase elements may bear a variety of symbols according to the overall function of that hybrid within the sentence. A hybrid fingure composed of a single word, however, always bears the same symbol. For example, a participle always acts as an adjective and bears a leaf symbol while a gerund always functions as a noun and bears a star symbol.

The shape of the models representing elements utilized in this system allows interengagement between members which characteristically interrelate. For example, the top of the adjective form interengages with the bottom of the noun form to indicate that adjectives characteristically modify nouns. One the other hand, unlike prior art, these models will not totally interlock in one correct position. Totally interlocking pieces cannot possibly afford the flexibility which is required to construct the wide variety of sentence constructions utilized in everyday speech. Furthermore, totally interlocking models may cause students to concentrate on "solving the puzzle" rather than learning the underlying grammar. This system is unique in that the shape of its elements will accomodate and suggest correct grammatical constructions, but the shape will not restrict the student to formulating only one correct construction. Indeed, the necessity for the student to employ inductive reasoning in sentence construction is one of the great novelties of this system.

Another novelty of this invention is that the student is not limited to predetermined sentences or words in constructing his own choice of sentences. Printed words do not appear already on the models, other than the word "to" on the adjective and adverb infinitive models and the words, "a, an, the" on the article model. Therefore, a student can use the same models again and again to experiment with sentence variety and vocabulary. The student, for example, may use an adjective form in one sentence to interengage with a noun, and then use the same adjective in another sentence to form a predicate adjective by interengaging with a verb with or without changing the actual word written on the adjective form.

BRIEF DESCRIPTION OF THE DRAWINGS

FIG. 1 is a front view of Element 10 representing a noun model.

FIG. 2 is a front view of Element 12 representing a pronoun model.

FIG. 3 is a front view of Element 14, representing a linking verb.

FIG. 4 is a front view of Element 16, representing a helping verb model.

FIG. 5 is a front view of Element 18 representing an intransitive action verb model.

FIG. 6 is a front view of Element 20 representing an action transitive verb model.

FIG. 7 is a front view of Element 22 representing an adjective model.

FIG. 8 is a front view of Element 24 representing an article of speech model.

FIG. 9 is a front view of Element 26 representing an adverb model.

FIG. 10 is a front view of Element 28 representing a co-ordinate conjunction model.

FIGS. 11 and 12 are front views of Elements 30 and 32 representing correlative conjunctions models.

FIG. 13 is a front view of Element 34 representing a subordinate conjunction model.

FIG. 14 is a front view of Element 36 representing a relative pronoun model which acts as a conjunction.

FIGS. 1–30 are used to demonstrate various correct syntactical constructions within the English language.

DETAILED DESCRIPTION OF DRAWINGS

While this invention is susceptible to embodiment in a wide variety of forms, utilizing different color schemes, model shapes, symbols, and assembly means, these detailed drawings, for purposes of clarity, will illustrate a single preferred embodiment. This embodiment will employ specific designated colors, shapes, symbols, and means of interlocking elements as described below; however, these drawings are not meant to limit this invention to the particular embodiment illustrated and described.

An overview of the drawings will show that there are thirty (FIGS. 1–30), individual models, hereinafter referred to as "elements," which are grouped to show that each element fits into one of ten (10) distinct sets. The elements of each set have been assigned a distinct color scheme to differentiate them from elements of other sets. FIGS. 31–57 utilize the aforementioned elements in order to demonstrate a variety of sophisticated syntactical constructions.

Figure 15:
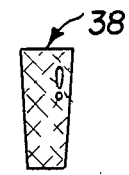
FIG. 15 is a front view of Element 38 representing an interjection model.
Figure 16:
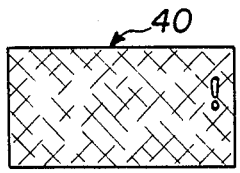
FIG. 16 is a front view of Element 40 represnting an independent element model; more specifically being a model of either an expletive or nominative absolute.
Figure 17:
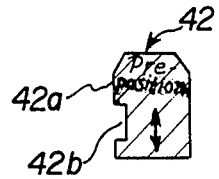
FIG. 17 is a front view of Element 42 representing a preposition model acting as an adjective.
Figure 18:
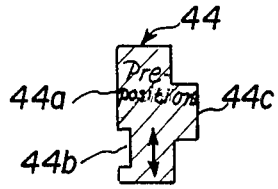
FIG. 18 is a front view of Element 44 representing a preposition model acting as an adverb.
Figure 19:
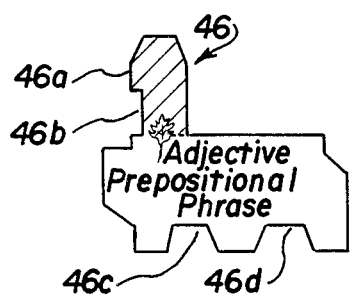
FIG. 19 is a front view of Element 46 representing an adjective prepositional phrase model.
Figure 20:
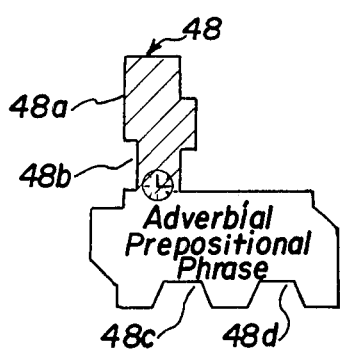
FIG. 20 is a front view of Element 48 representing an adverbial prepositional phrase model.
Figure 21:
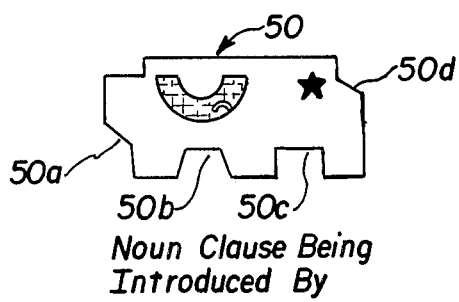
FIG. 21 is a front view of Element 50 representing a noun clause model being introduced by a subordinate conjunction.

FIGS. 1 and 2, which are colored white, show elements belonging to Set One. Members of Set One share noun-like similarities. FIGS. 3, 4, 5, and 6, which are colored red, show elements belonging to Set Two. Members of Set Two share verb-like characteristics. Members of Set Three, represented by FIGS. 7 and 8, share adjective-like characteristics and are colored green. FIG. 9, which is colored blue, shows the element belonging to Set Four, having the characteristics of an adverb. FIGS. 10, 11, 12, 13, and 14, which are colored yellow, show elements belonging to Set Five. Members of Set Five share conjunction-like characteristics. FIGS. 15 and 16, which are colored orange, show elements belonging to Set Six. Members of Set Six share the characteristics of independent elements. FIGS. 17 and 18, which are colored brown, show elements belonging to Set Seven. Members of Set Seven share preposition-like characteristics. FIGS. 19 and 20, which are colored brown and white, show elements belonging to Set Eight. Members of Set Eight are phrase elements which contain a preposition. FIGS. 21, 22, 23, 24, and 25, which have two colors, one of which is always yellow, show elements belonging to Set Nine. Members of Set Nine represent clause elements which are introduced by subordinate conjunctions or relative pronouns. FIGS. 26, 27, 28, 29, and 30, which are colored with at least two colors, one of which is always red, show elements belonging to Set Ten. Members of Set Ten share the chzracteristics of verbal elements.

Another overview of the drawings will disclose that each element bears one or more of eight distinct symbols on its face. The presence of these symbols indicates the function of that particular element as a part of speech.

The element described by FIG. 1 bears a solid star, designating that the function of that element, a noun, is to name things. The element described by FIG. 2 bears a similar hollow star to distinguish it from the noun, and to designate that the function of a pronoun is to substitute for a noun and also to name things. The elements described by FIGS. 3, 4, 5, and 6, bear a wave-like symbol, designating that the function of those elements, as verbs, is to show action or motion. The elements described by FIGS. 7 and 8, bear the symbol of a leaf, designating that the function of an adjective and an article is to modify a noun or pronoun. The element described by FIG. 9 bears the symbol of a clock, designating that the function of an adverb is to tell when, where, or how a verb, adjective or adverb acts.

The elements described by FIGS. 10, 11, 12, and 13, bear the symbol of a bridge, designating tha the function of a conjunction is to connect words or phrases. The element described by FIG. 14 bears a hollow star, designating that the function of a relative pronoun is to connect as a conjunction by relating back to a noun within the sentence. The elements demonstrated by FIGS. 15 and 16, bear the sumbol of an exclamation mark, This exclamation mark designates that it is always the function of an independent element to stand alone to express emotion. The elements described by FIGS. 17 and 18, bear the symbol of a double-sided arrow, designating that the function of a preposition is to show the relationship between a noun-like element and another word in a sentence.

The element which is described by FIG. 19 bears the symbol of a leaf, designating that the function of an adjective prepositional phrase is to modify or describe a noun or noun-like element. The element described by FIG. 20, bears the symbol of a clock, designating that the function of an adverbial prepositional phrase is to tell when, how, or where a verb acts. The element described by FIG. 21, bears two symbols, a bridge and a star, designating that when a noun clause is introduced by a subordinate conjunction, the function of the conjunction is to connect the clause to the main sentence, while the purpose of the entire noun clause is to function as a noun.

Figure 22:
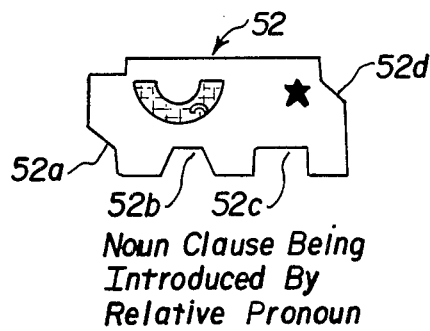
FIG. 22 is a front view of Element 52 representing a noun clause model being introduced by a relative pronoun.
Figure 23:
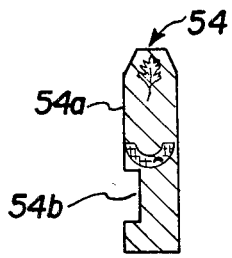
FIG. 23 is a front view of Element 54 representing an adjective clause introduced by a subordinate conjunction.
Figure 24:
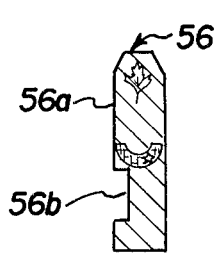
FIG. 24 is a front view of Element 56 representing an adjective clause model being introduced by a relative pronoun.

The element described by FIG. 22 bears two symbols, a hollow star and a solid star. These symbols designate that when a noun clause is introduced by a relative pronoun, the function of the relative pronoun is to connect the clause to the sentence and to relate back to another noun in the sentence. The function of the entire clause is to act as a noun. The element described by FIG. 23 bears two symbols, a leaf and a bridge, designating that when an adjective clause is introduced by a subordinate conjunction, the function of the conjunction is to connect the clause to the sentence. The function of the entire adjective clause is to modify a noun-like element. The element described by FIG. 24 bears two symbols, a leaf and a hollow star, designating that when an adjective clause is introduced by a relative pronoun, the function of the pronoun is to connect the clause to the sentence and to relate back to a noun in the sentence. The function of the entire clause is to modify a noun-like element.

Figure 25:
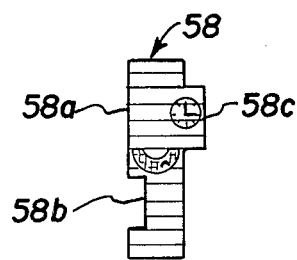
FIG. 25 is a front view of Element 58 representing a model of an adverbial clause being introduced by a subordinate conjunction.
Figure 26:
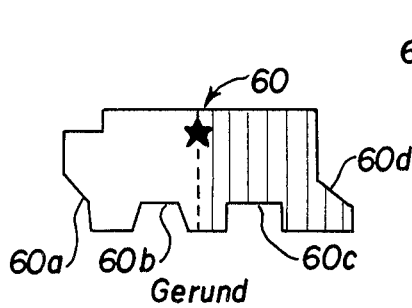
FIG. 26 is a front view of Element 60 representing a gerund model.
Figure 27:
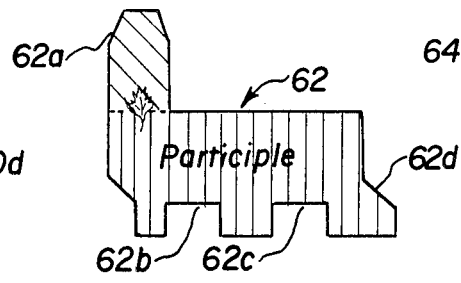
FIG. 27 is a front view of Element 62 representing a participle model.

The element which is described by FIG. 25 bears two symbols, a bridge and a clock, designating that when an adverbial clause is introduced by a subordinate conjunction, the function of the conjunction is to connect the clause to the sentence and the function of the entire clause is to modify a verb or adverb. The element described by FIG. 26 bears the symbol of a star, designating that the function of a gerund is to function as a noun. The element which is described by FIG. 27 bears the symbol of a leaf, designating that the function of a participle is to act as an adjective.

Figure 28:
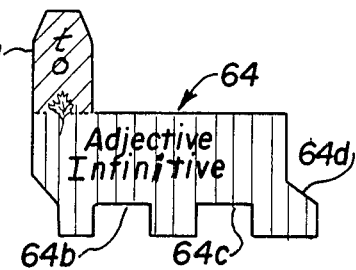
FIG. 28 is a front view of Element 64 representing an adjective infinitive model.
Figure 29:
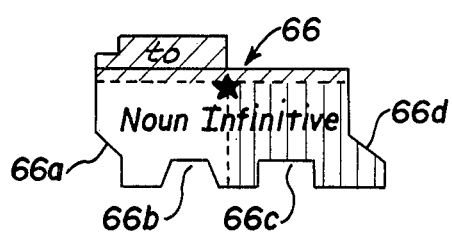
FIG. 29 is a front view of Element 66 representing a noun infinitive model.
Figure 30:
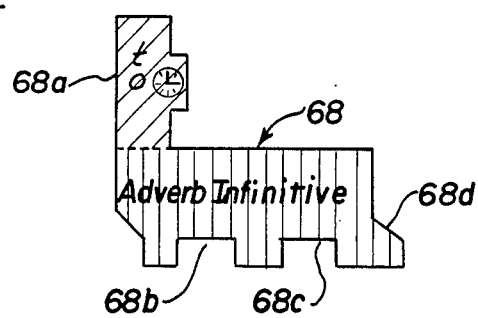
FIG. 30 is a front view of Element 68 representing an adverb infinitive model.

The element which is described by FIG. 28 bears the symbol of a leaf, designating that the function of an adjective infinitive is to modify a noun-like element. The element described by FIG. 29 bears the symbol of a star, designating that the purpose of a noun infinitive is to function as a noun. The element described by FIG. 30 bears the symbol of a clock, designating that the function of an adverb infinitive is to modify a verb or adverb.

Another overview of the drawings, as seen in FIGS. 31–57, will show that each individual element can be combined to construct a wide variety of phrases, clauses, and sentences. One will notice that it is the position and sequence of these interengaging elements, rather than any inherent characteristic of a particular element, that will determine the sentence-part of that element; i.e. subject, predicate, modifier, appositive, and the like. For example, reading from left to right, the subject of a clause or sentence will be represented by one or more noun or noun-like elements which precede one or more verb elements, and interengage in a slightly elevated manner with the left-hand side of that verb element. The predicate of a clause or sentence will be represented by one or more verb elements which follow a noun or noun-like element(s) which form the subject of the construction.

The complement(s) of a clause or sentence will be represented by one or more nouns, noun-like elements, or adjective elements, which follow a linking or transitive verb, interengaging with the right-hand side of the verb. Examples of common complements are: direct objects, indirect objects, predicate nominatives, predicate adjectives, and objective complements. The identity of each complement is further distinguished from one another by its vertical position above or below the plane of the predicate. The modifier(s) of a clause or sentence will be represented by one or more article, adjective or adverbial elements which are interengaged in a vertical column with one or more noun, noun-like, verb, or verb-like elements.

It can also be seen that just as the sentence-part of an element is determined by the position and sequence of an element, likewise, the case of an element is also designated by the positional interengagement of that element within the construction. Therefore, any noun or group of nouns interengaged as subjects will be determined to be in the nominative case, as will any noun or noun-like element which interengages following a linking verb. On the other hand, any noun or noun-like element which interengages with a transitive verb, an infinitive, a preposition or a noun designated as a direct-object, is determined to be in the objective case. Common examples of noun or noun-like elements in the objective case are: direct objects, indirect objects, objective complements, objects of prepositions, and subjects or objects of infinitives.

FIGS. 1 and 2, which represent the elements contained in Set One, are colored white. FIG. 1, element 10, representing the noun element, bears a solid star on its face, and indicates that the function of nouns is to name things. FIG. 2, illustrating element 10, represents the pronoun, and bears a hollow star on its face to distinguish it from the noun, and to indicate that pronouns also name things. The shapes of elements 10 and 12 are identical, indicating that nouns and pronouns relate to other elements of speech in an identical manner. At position 10a and 12a, respectively, elements 10, 12, 28, 30, 32, 60, and 66, will interengage with elements 10 and 12. At positions 10b and 10c, elements 22, 24, 42, 46, 54, 56, 62, and 64, will interengage with element 10. The aforesaid elements will also interengage with positions 12b and 12c on element 12. At positions 10d and 12d, elements 10, 12, 14, 16, 18, and 20, ill interengage with elements 10, 12, 60, and 66. At positions 10e and 12e, elements 10, 12, 22, 50, and 52, will interengage with elements 10 and 12.

FIGS. 3, 4, 5, and 6, represent verb elements 14, 16, 18, and 20, which are members of Set Two and are colored red. All members of this set bear the wave-like symbol on their face, indicating that the function of the verb is to indicate action. Element 14, the linking verb, is shaped to so that elements 10, 12, 16, 50, 52, 60, and 66, can interengage with element 14 at position 14a. At position 14b, elements 26, 44, 48, 58, and 68, will interengage with element 14. At position 14c, elements 10, 12, 22, 50, 52, 54, 56, 60, and 66, can interengage with element 14. Element 16, the helping verb, is shaped to interengage with other elements at position 16a. Elements 10, 12, 16, 50, 52, 60, and 66, will interengage at position 16a on element 16. At position 16b, elements 26, 44, 48, 58, and 68, will interengage with element 16. Elements which will also interengage with element 16 at position 16c are elements 14, 16, 18, and 20. Element 18, representing the intransitive verb, is shaped to interengage with elements 10, 12, 16, 50, 52, 60, and 66, at position 18a. Element 18 is shaped to provide two identical recesses for interengagement located at positions 18b and 18c. Elements which will interengage at positions 18b and 18c are elements 26, 44, 48, 58, and 68. Element 18, as an intransitive verb, is never followed by a complement; therefore no element will interengage with element 18 at position 18d. Element 20, the transitive verb, is shaped to interengage with various elements at position 20a. Elements which will interengage with element 20 at this position are elements 10, 12, 16, 50, 52, 60, and 66. Element 20 is shaped to bear two identical rectangular recesses on its lower edge which are capable of interengagement. These two recesses are designated as positions 20b and 20c. Elements which will interengage with element 20 at positions 20b and 20c are elements 26, 44, 48, 58, and 68. Element 20 is shaped so that it is capable of interengagement at position 20d. Elements which will interengage with element 20 at position 20d are elements 10, 12, 50, 52, 60, and 66.

FIGS. 7 and 8 illustrate elements 22 and 24, which belong to Set Three, and are colored green. Element 22, the adjective element, and element 24, the article element, bear the symbol of a leaf on their face, to indicate that the function of an adjective is to describe or designate. Element 22 can interengage at position 22b with elements 26, 44, 48, and 68. Element 24 also interengages at identical positions 24a and 24b, with elements 10, 12, 19, 20, 26, and 66.

FIG. 9, represents the single element of Set Four, element 26, which is colored blue. The adverb element bears a clock on its face, indicating that the function of adverbs is to modify verbs to tell when, where, how, and to what degree verbs, adjectives or adverbs act. It is shaped to interengage with elements 14, 16, 18, 20, 60, 62, 64, 66, and 68 at position 26a. Element 26 will also interengage at position 26b with elements 26, 44, 48, 58, and 68. Element 26 will interengage at position 26c with element 22, 26, 42, 44, 46, and 48.

FIGS. 10–14, represent conjunction-like elements 28, 30, 32, 34, and 36, which are colored yellow. Elements 28, 30, 32, and 34 bear the symbol of a bridge on their face to indicate that the function of a conjunction is to connect words, clauses and phrases. Element 36 bears the symbol of a hollow star on its face to designate that the connecting element is a relative pronoun that relates back to a noun or noun-like element in the sentence.

Element 28, represents a coordinate conjunction, and is shaped to interengage with other elements at positions 28a and 28b. Elements which will interengage with element 28 at positions 28a or 28b, are elements 10, 12, 14, 16, 18, 20, 40, 50, 52, 60, and 66. Element 28 can also be interengaged at position 28c with elements 22, 26, 38, 42, 44, 46, 48, 54, 56, 58, 62, 64, and 68. Elements 30 and 32, which represent correlative conjunctions, can interengage with elements 22, 26, 38, 42, 44, 46, 48, 54, 56, 58, 62, 64, and 68, at position 30b and 32b respectively. Elements 30 and 32 can also interengage at positions 30a and 32a respectively with elements 10, 12, 14, 16, 18, 20, 40, 50, 52, 60, and 66.

Elements 34 and 36 representing subordinate conjunctions do not actively interengage with other elements; rather, they appear on the faces of subordinate clause elements in Sets Eight and Nine. This method of "inactive" interengagement allows each clause element to function precisely as the part of speech that it represents without the interference of a separate adjoining element. With this method, an adjective clause element can interengage directly with the noun element that it modifies instead of being "linked" to that element by a subordinate conjunction, clearly showing that the adjective clause functions as an adjective modifier. Also, the inclusion of the subordinate conjunction element on each subordinate clause element shows that every subordinate clause must be joined by either a subordinate conjunction or a relative pronoun.

FIGS. 15 and 16, illustrate the elements of Set Six, elements 38 and 40, which are colored orange and represent independent elements. Independent elements do not interengage with other elements because they never function as a part of the sentence, such as subject, predicate, complement, or modifier. In some instances, however, they may be joined at their top edges by co-ordinate or correlative conjunctions.

FIGS. 17 and 18 illustrate elements 42 and 44 of Set Seven, which are colored brown and represent prepositions. Each preposition element bears a double-arrow on its face, indicating that the function of the preposition is to connect a group of words to a sentence. Element 42, representing a preposition functioning as an adjective can interengage with other elements at positions 42a and 42b. Elements which will interengage at position 42a are elements 10, 12, 46, 48, 60, and 66; elements which will interengage at position 42b are elements 26, 44, 48, and 68. Element 44 will interengage at position 44a with elements 14, 16, 18, 20, 60, 62, 64, 66, and 68. It will also interengage at position 44b with elements 26, 44, 48, 58, and 68. Element 44 will interengage at position 44c with elements 22, 26, 42, 44, 46, and 48.

FIGS. 19 and 20, illustrate the elements of Set Eight, elements 46 and 48. These elements are colored brown and white and function as prepositional phrases. Element 46, representing a prepositional phrase acting as an adjective, will interengage at position 46a with elements 10, 12, 60, and 62. Element 46 will interengage with elements 26, and 44, at position 46b. At positions 46c and 46d, element 46 will interengage with elements 22, 24, 54, 56, 62, and 64. Element 48, representing a prepositional phrase acting as an adverb, will interengage with elements 14, 16, 18, 20, 60, 62, 64, 66, and 68, at position 46a. At position 46b, element 48 will interengage with elements 26 and 44. At positions 48c and 48d, element 48 will interengage with elements 22, 24, 54, 56, 62, and 64.

FIGS. 21-25 illustrate elements 50, 52, 54, 56, and 58, belonging to Set Nine. The elements of Set Nine are colored part yellow and part another color. These elements are alike in that they function as some type of clause which is introduced by either a subordinate conjunction or a relative pronoun. Each element bears two symbols, one located on the subordinate conjunction or relative pronoun which introduces the noun clause, as explained above in Set Five. The other symbol located on the face of elements 50-58, is either a star, leaf of clock, corresponding to the function of the entire phrase as either a noun, adjective or adverbial phrase. Element 50, representing a noun clause introduced by a subordinate conjunction, interengages with elements 14, 20, 60, 62, 64, 66, and 68, at position 50a. At position 50b, elements 54 and 56 will interengage, while at position 50c, element 58 will interengage. Element 50 will also interengage at position 50d with elements 14, 16, 18, and 20.

Element 52, will interengage similarly with the aforesaid elements at its positions which are identical to those of element 50. Element 54, representing an adjective clause introduced by a subordinate conjunction, will interengage with elements 50 and 52. At position 54b, elements 56 and 58 will interengage. Element 56, representing an adjective clause introduced by a relative pronoun, will interengage similarly with the aforesaid elements at its positions which are identical to those of element 54. Element 58, representing asn adverbial clause introduced by a subordinate conjunction, will interengage at position 58a with elements 50 and 52. At position 58b, element 58 will interengage with itself, and at position 58c, elements 54, 56, and 58 will interengage.

FIGS. 26-30 illustrate elements 60, 62, 64, 66, and 68, belonging to Set Ten. The elements of Set Ten are colored with more than one color, one of which is always red, to indicate the function of these elements are verbals. Element 60, representing the gerund, will interengage at position 60a with elements 14, 16, 64, 66, and 68. At position 60b, elements 22, 24, 42, 46, 54, 56, 62, and 64 will interengage. At position 60c, elements 26, 44, 48, 58, and 68 will interengage. Elements 10, 12, 14, 16, 18, 20, 50, and 52, will interengage. Element 62, representing a participle, will interengage with elements 10, 12, 60, and 66 at position 62a. At positions 62b and 62c, elements 26, 44, 48, 58, and 68 will interengage. At position 62d, elements 10, 12, 14, 16, 18, 20, 50, and 52, will interengage. Element 64, representing an adjective infinitive, will interengage with elements 10, 12, 60, and 66 at position 64a. At positions 64b and 64c, elements 26, 44, 48, 58, and 68, will interengage. At position 64d, elements 10, 12, 14, 16, 18, 20, 50, and 52, will interengage. Element 66, representing a noun infinitive, will interengage with elements 14, 16, 64, 66, and 68, at position 66a. At position 66b, elements 22, 24, 42, 46, 54, 56, 62, and 64, will interengage. At position 66c, elements 26, 44, 48, 58, and 68 will interengage. At position 66d, elements 10, 12, 14, 16, 18, 20, 50, and 52, will interengage. Element 68, representing an adverb infinitive, will interengage with elements 14, 16, 18, 20, 60, 62, 64, 66, and 68, at position 68a. At positions 68b and 68c, elements 26, 44, 48, 58, and 68, will interengage. At position 68d, elements 10, 12, 14, 16, 18, 20, 50, and 52, will interengage.

Figure 31:
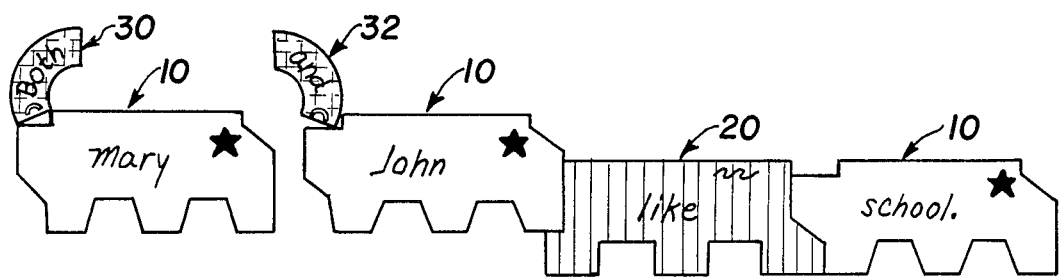
FIGS. 31–57 are examples of how the individual elements described in the foregoing

FIG. 31 shows how "Figures of Speech" can be used to construct the sentence: "Both Mary and John like school." In this sentence, elements 30 and 32, representing correlative conjunctions, interengage with two different noun forms to form the compound subject, "Mary and John" in the sentence. Element 20, representing the transitive verb "like," interengages horizontally, with the right-hand side of element 10, "John," in a slightly-elevated manner, to indicate that "Mary and John," is the subject, while the noun to the right, "school", is the direct object of the sentence. "Mary and John," as the subject, is in the nominative case, and "school," as the direct object is in the objective case.

Figure 32:
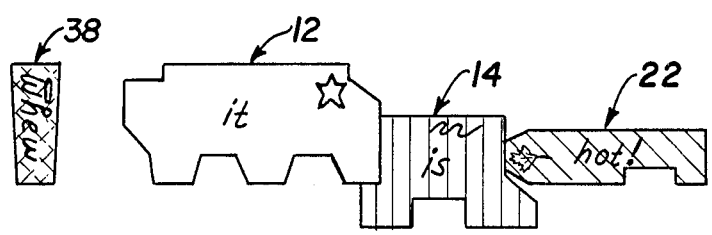

FIG. 32 shows the co-operation of individual elements to construct the sentence: "Whew? It is hot." Element 38, representing an interjection, does not directly attach to the rest of the sentence, which indicates that it functions as an independent element and bears no relationship to the rest of the sentence. Element 12, representing a pronoun, does interengage, in a slightly-elevated manner, with the left-hand side of element 14, representing a linking verb. This interengagement indicates that element 12 functions as the subject of the sentence and element 14 functions as the predicate of the sentence. Element 14, representing the linking verb, interengages on its right-hand side with adjective form 22, indicating that element 22 functions as the predicate adjective. Element 12, as subject, is determined to be in the nominative case.

Figure 33:
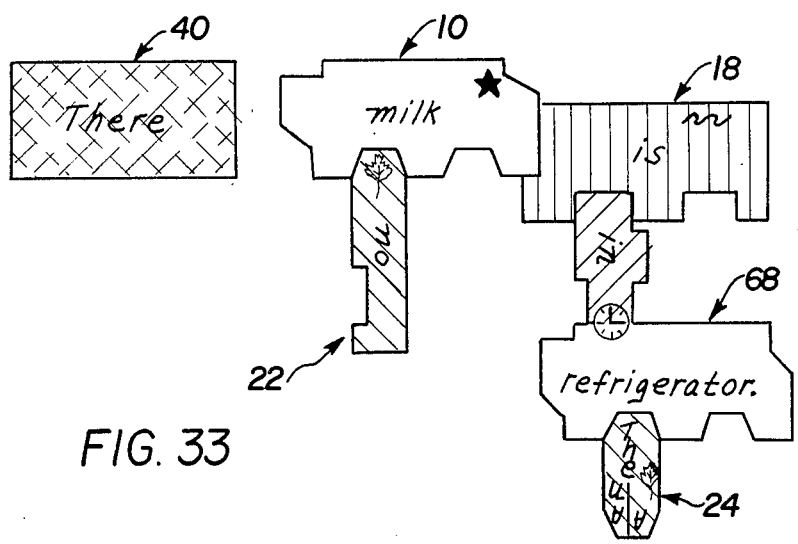

FIG. 33 shows the co-operation of individual elements to construct the sentence: "There is no milk in the refrigerator." Element 40 does not directly interengage with the sentence, designating its status as an independent element. Element 10, representing a noun form, however, interengages in a slightly-elevated manner on its right-hand side, with element 18, the intransitive verb, indicating that "milk" functions as the subject of the sentence. It also interengages vertically with adjective element 22, indicating that element 22 modifies element 12. Element 18, representing a transitive verb, interengages vertically with element 68, the adverbial prepositional phrase, "in the refrigerator", indicating that the phrase acts as an adverb, further modifying the verb intransitive verb, "is". Element 24, interengaging vertically with the object of the prepositional phrase, "refrigerator" indicates that it modifies the object of the prepositional phrase represented by element 68. The noun, "refrigerator", as the object of the prepositional phrase, is determined to be in the objective case, and the noun, "milk", as the subject of the sentence, is determined to be in the nominative case.

Figure 34:
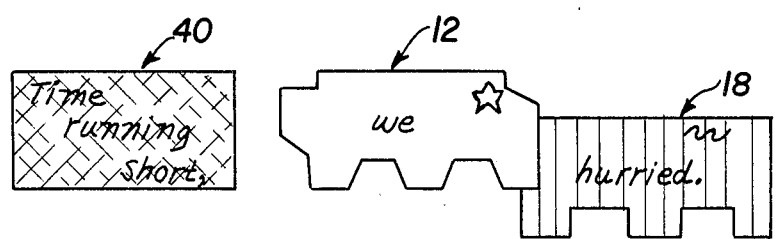

FIG. 34 shows the co-operation of individual elements to construct the sentence: "Time running short, we hurried." Element 40 does not interengage with the rest of the sentence, illustrating its status as an independent element. Element 12, representing a pronoun, interengages in a slightly-elevated manner, with the right-hand side of element 18, representing the intransitive verb "hurried". This indicates that element 12 functions as the subject and that element 18 functions as the predicate of the sentence. Element 12, as the subject, is determined to be in the nominative case.

Figure 35:
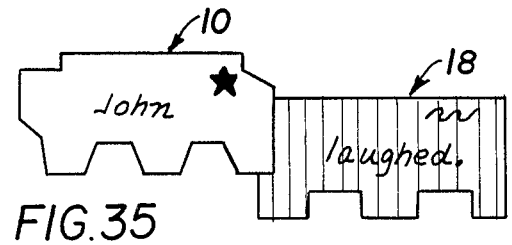

FIG. 35 shows the co-operation of individual elements to construct the sentence: "John laughed." Element 10, representing the noun, "John," interengages in a slightly-elevated manner with the right-hand side of element 18, representing the intransitive verb, "laughed." This indicates that element 10 functions as the subject and that element 18 functions as the predicate. Element 10, functioning as the subject, is determined to be in the nominative case.

Figure 36:
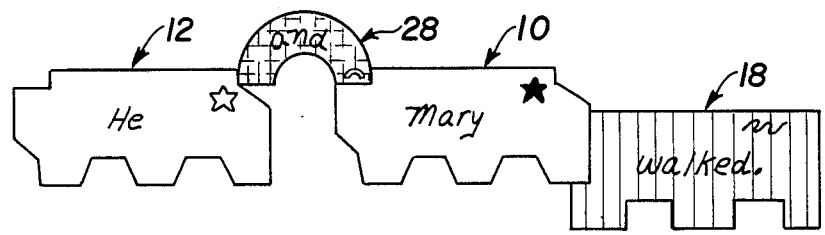

FIG. 36 shows the co-operation of individual elements in the construction of the sentence: "He and Mary walked." Elements 12 and 10 are connected by the interengagement of element 28, representing the co-ordinate conjunction, "and." The interengagement of element 10, in a slightly-elevated manner, with the left-hand side of element 18, representing an intransitive verb, indicates that "He and Mary" is the compound subject of the sentence and element 18 is the predicate of the sentence. The shape of the intransitive verb, as indicated by its straight right-hand side, demonstrates that a complement never follows an intransitive verb.

Figure 37:
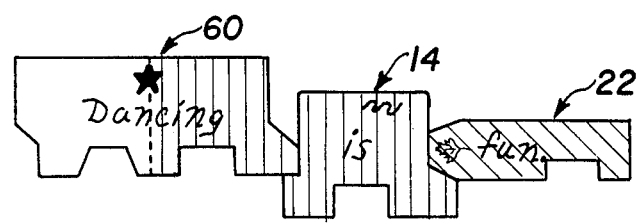

FIG. 37 shows the co-operation of individual elements to construct the sentence: "Dancing is fun." Element 60, representing a gerund, interengages in a slightly-elevated manner, with the left-hand side of element 14, representing a linking verb. This interengagement indicates that element 60 functions as the subject of the sentence and element 14 functions as the predicate of the sentnece. The interengagement of element 22, following element 14 indicates that element 22 functions as a predicate adjective. Element 60, the gerund "dancing," as subject, is determined to be in a the nominative case.

Figure 38:
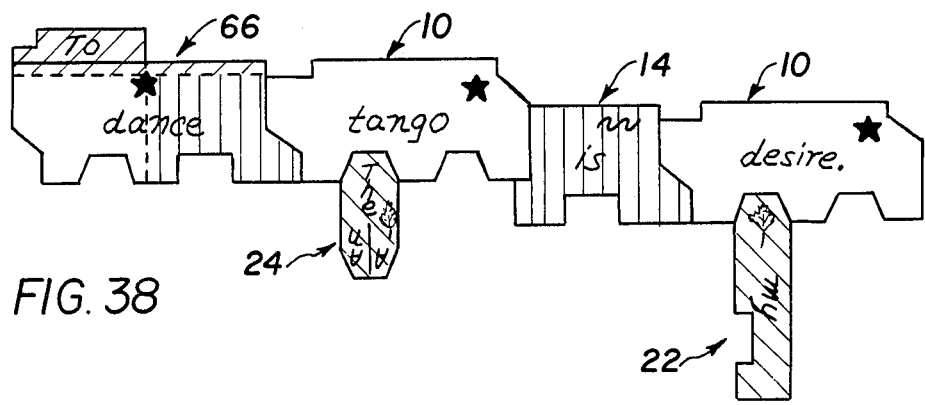

FIG. 38 shows the co-operation of individual elements to construct the sentence: "To dance the tango is my desire." Element 66, representing a noun infinitive, interengages horizontally with the left-hand side of element 10, representing a noun form. This interengagement indicates that element 10 is the object of the the noun infinitive, "To dance." Element 10 is further modified by the vertical interengagement of element 24, representing an article of speech. Element 10 interengages in a slightly-elevated manner on the left-hand side of element 14, representing a linking verb. The entire phrase, "To dance the tango," is designated as the subject of the sentence, in that the entire phrase is slightly-elevated above the verb. Likewise, the linking verb, "is," intergaging on its left-hand side with element 10, indicates that it functions as the predicate of the sentence. Element 14 interengages on its right-hand side with another noun form, indicating that the "desire" functions as the predicate-nominative of the sentence. Element 10 interengages vertically with element 22, representing an adjective. This indicates that element 22 modifies element 10. The infinitive phrase, "To dance the tango," designated as the subject, is determined to be in the nominative case; "tango," as the complement of the infinitive, is in the objective case. The noun "desire," designated as the predicate nominative, is determined to be in the nominative case.

Figure 39:
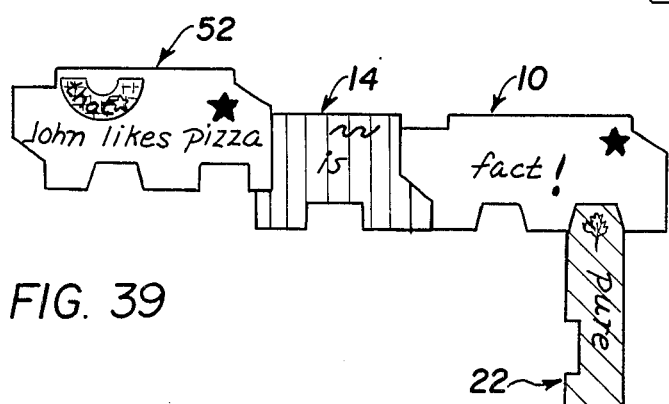

FIG. 39 shows the co-operation of individual elements to construct the sentence: "That John likes pizza is pure fact." Element 52, representing a noun clause being introduced by a subordinate conjunction, functions as the subject of the sentence. This can be demonstrated by the fact that element 52 interengages in a slightly-elevated manner with the left-hand side of element 14, representing a linking verb. The fact that element 14, a verb form, interengages on its left-hand side with a noun form designates element 14 as the predicate of the sentence. Element 14 also interengages on its right-hand side with element 10, indicating that "fact" acts as the predicate nominative in the sentence. The vertical interengagement of element 22, representing an adjective, with element 10, indicates that element 22 modifies element 10. Since the property of case is pertinent only to nouns and pronouns, there is no case applicable to the clause designated as the subject of this sentence. "Fact," however, which is designated as the predicate nominative, is determined to be in the nominative case.

Figure 40:
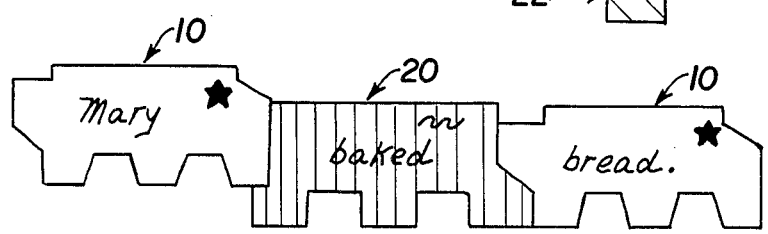

FIG. 40 shows the co-operation of individual elements to construct the sentence: "Mary baked bread." The interengagement of element 10 in a slightly-elevated manner, with the left-hand side of element 20, representing a transitive verb, indicates that element 10 functions as the subject, and element 20 functions as the predicate of the sentence. The interengagement of another element 10, representing a noun form, on the right-hand side of element 20 indicates that element 10, "bread," functions as a direct object. Element 10, "Mary," designated as the subject, is determined to be in the nominative case. Element 10, "bread," designated as the direct object, is determined to be in the objective case.

Figure 41:
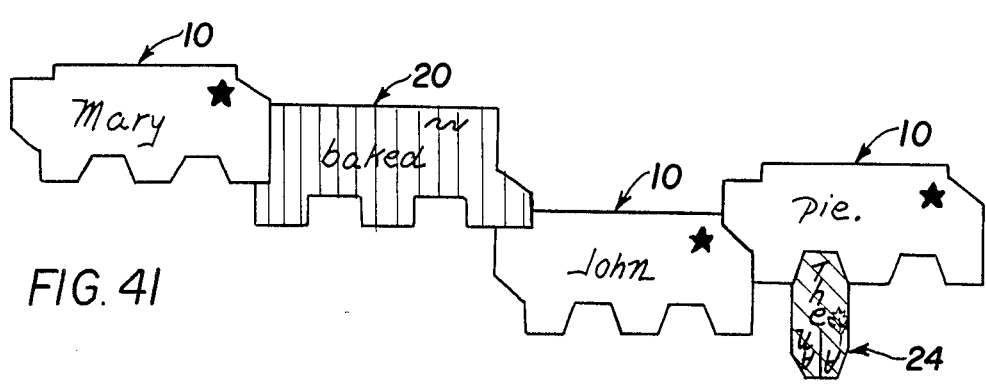

FIG. 41 shows the co-operation of individual elements to construct the sentence: "Mary baked John a pie." Element 10, "Mary," interengages in a slightly-elevated manner with the left-hand side of element 20, "baked," representing a transitive verb. This interengagement indicates that "Mary" is the subject and "baked" is the predicate of the sentence. The interengagement, in a slightly-lower position, of another element 10, "John," with the element 10, "pie" on the right-hand side and the element 20, "baked" on the left-hand side, indicates that the element 10, "John," is the indirect object and "pie" is the direct object of the sentence. Element 24 interengages vertically with said element 10 to modify the word "pie." "Mary," as subject, is determined to be in the nominative case, while "John" and "pie," as indirect and direct objects, respectively, are in the objective case.

Figure 42:
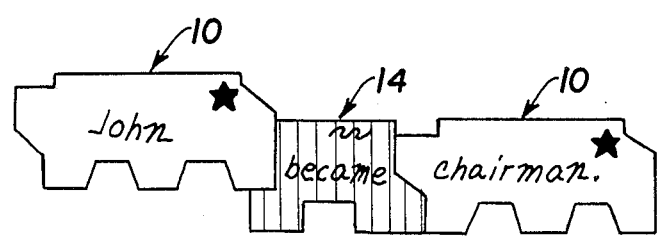

FIG. 42 shows the co-operation of individual elements to construct the sentence: "John became chairman." Element 10, representing a noun form, interengages in a slightly-elevated manner on its right-hand side with element 14, the linking verb, "became." This interengagement designates that "John" is the subject and "became" is the predicate. Element 10, "chairman," interengages on its left-hand side with the linking verb "became," indicating that "became" is the predicate nominative. Anytime a noun or noun-like element interengages with the right-hande side of a linking-verb, it is always designated as the predicate nominative. "John,"

as subject, and "chairman," as predicate nominative, are both determined to be in the nominative case.

Figure 43:
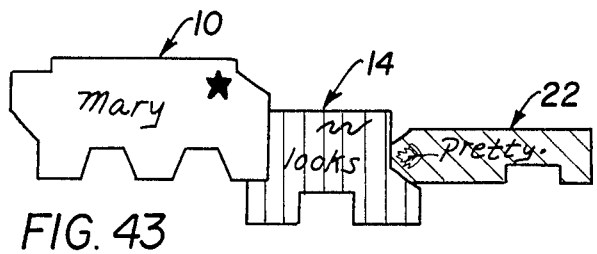

FIG. 43 shows the co-operation of individual elements to construct the sentence: "Mary looks pretty." Element 10, representing a noun form, interengages is a slightly-elevated manner on its right-hand side with element 14, a linking verb, "looks." This interengagement designates that "Mary" is the subject and "looks" is the predicate. Element 22, "pretty," representing an adjective form, interengages on the right-hand side in a horizontal column with the linking verb, "looks," indicating that it is the predicate adjective of the sentence. Anytime an adjective elements interengages in a horizontal column with the right-hand side of a linking verb, it is determined to be a predicate adjective. "Mary," as subject is in the nominative case; predicate adjectives do not have case.

Figure 44:
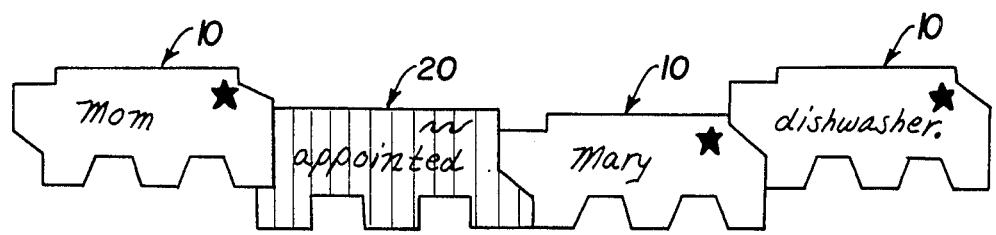

FIG. 44 shows the co-operation of individual elements to construct the sentence: "Mom appointed Mary dishwasher." Element 10 interengages in a slightly-elevated position on its right-hand side with element 20, representing a transitive verb. This interengagement shows that "Mom" is the subject and "appointed" is the predicate of the sentence. Element 10, "Mary," interengages on its right-hand side with element 20, the transitive verb, and also interengages on its right-hand side with another noun element, "dishwasher." These two interengagements designate "Mary" as the direct object and "dishwasher" as the objective complement of the sentence. Anytime a noun or noun-like element interengages on its left-hand side with a transitive verb, it is the direct object, therefore, "Mary" is the direct object. Whenever a noun or noun-like element interengages on its left-hand side with the right-hand side of another noun or noun-like form designated as the direct object, it is designated as the objective complement. Therefore, "dishwasher" is the objective complement of the sentence. "Mom," as subject is in the nominative case; "Mary" and "dishwasher" as direct object and objective complement respectively, are determined to be in the objective case.

Figure 45:
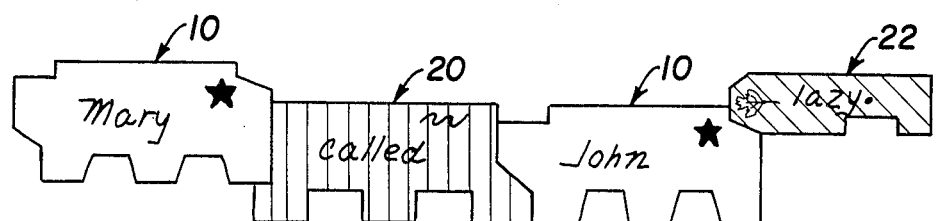

FIG. 45 shows the co-operation of individual elements to construct the sentence: "Mary called John lazy." Element 10, "Mary," interengages in a slightly-elevated position with the left-hand side of element 20, the transitive verb, "called." This interengagement shows that "Mary" functions as the subject and "called" functions as the predicate. Element 10, "John," interengages on its left-hand side with element 20, the transitive verb, indicating that "John" is the direct object. The interengagement of element 22, an adjective form on the upper right-hand side of element 10, a noun, designated as the direct object, following element 20, the verb, indicates that "lazy" functions as an objective complement. Noun or noun-like elements or adjective elements that interengage with the upper right-hand side of a noun form designated as the direct object, are always identified as objective complements. Objective complements can be either nouns or adjectives. "Mary," as subject, is in the nominative case, "John," as direct object, is in the objective case, and "lazy" as an adjective, has no case.

Figure 46:
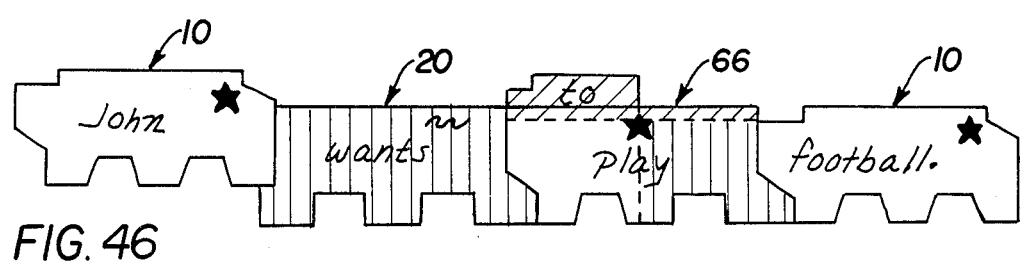

FIG. 46 shows the co-operation of individual elements to construct the sentence: "John wants to play football." Element 10, "John," interengages in a slightly-elevated position with element 20, "wants," representing a transitive verb. This interengagement shows "John" as the subject and "wants" as the predicate. The interengagement of element 66, the infinitive noun, "to play," with the right-hand side of element 20, the verb, indicates that element 66 is a portion of the direct object. The interengagement of element 66 with element 10 on its right-hand side, both elements following the transitive verb, "wants," shows that the phrase, "to play football," is the direct object of the sentence. The subject, "John" is in the nominative case; the object of the infinitive, "to play," which is "football," is in the objective case, as is "to play," the infinitive.

Figure 47:
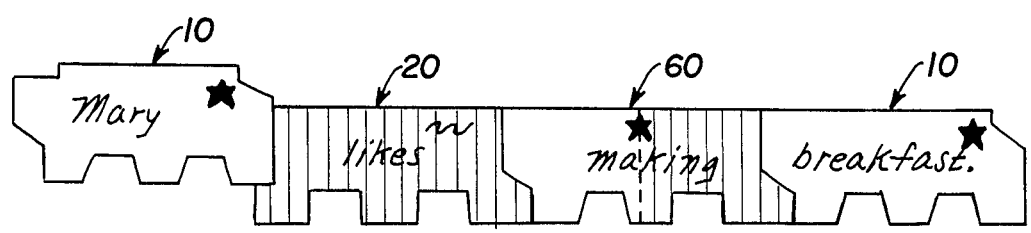

FIG. 47 shows the co-operation of individual elements to construct the sentence: "Mary likes making breakfast." Element 10, "Mary," interengages in a slightly-elevated position with element 20, representing a transitive verb. This interengagement shows that "Mary" functions as the subject while "likes" functions as the predicate. The interengagement of element 60, a gerund, on the right-hand side of element 20, shows that "making" is a portion of the direct object. The interengagement of element 60 with the element 10, "breakfast" indicates that it also represents a portion of the direct object, "making breakfast." "Mary," as subject, is in the nominative case, while "making" and "breakfast," are both in the objective case.

Figure 48:
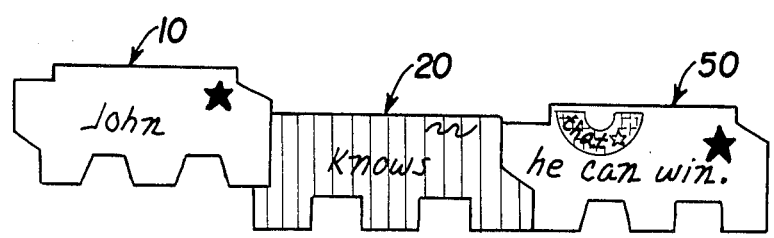

FIG. 48 shows the co-operation of individual elements to construct the sentence: "John knows that he can win." Element 10, "John," interengages, in a slightly-elevated position, with the left-hand side of element 20, the transitive verb. This interengagement indicates that "John" is the subject, and "knows" is the predicate. The interengagement of element 50, a noun clause, with the right-hand side of element 20, the transitive verb, indicates that the clause, "that he can win" functions as the direct object of the sentence. "John," as subject is determined to be in the nominative case. The clause, "that he can win," does not have case because case is not a clausal property, however the subject of the clause, "he" is determined to be in the nominative case.

Figure 49:
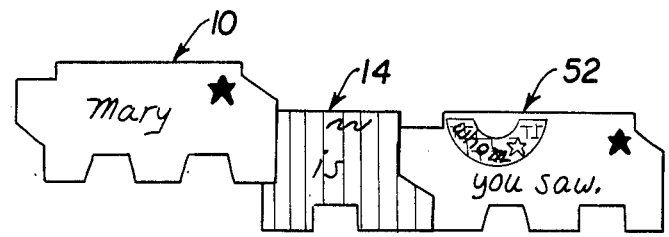

FIG. 49 shows the co-operation of individual elements to construct the sentence: "Mary is whom you saw." Element 10, "Mary" interengages with the left-hand side of element 14, a linking verb. This interengagement indicates that "Mary" is the subject, and "is" is the predicate. The interengagement of element 52, a noun clause, on the right-hand side of element 20, the linking verb, indicates that the clause, "whom you saw," functions as the predicate nominative. Anytime that a noun clause interengages on with the right-hand side of a linking verb, it is designated as the predicate nominative. "Mary," as subject, is determined to be in the nominative case.

Figure 50:
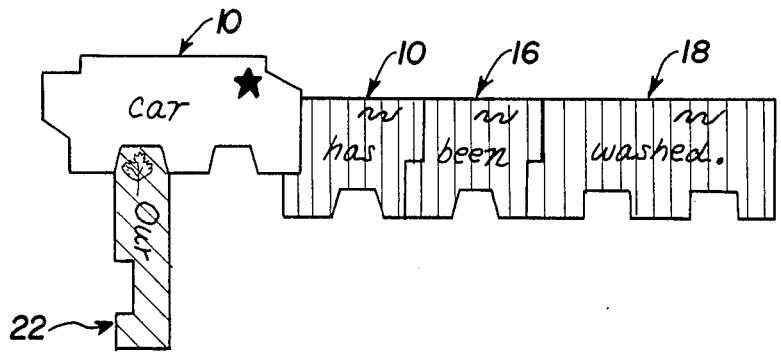

FIG. 50 shows the co-operation of individual elements to construct the sentence: "Our car has been washed." Element 10, "car," interengages in a slightly elevated position with the left-hand side of element 16, the helping verb, "has." Element 16 interengages on its right-hand edge with another element 16, "been," and this element in turn, interengages on its right edge with element 18, an intransitive verb, "washed." The aforementioned interengagements indicate that "car" is the subject, and "has been washed" is the predicate of the sentence. Any time one or more helping verbs interengage with each other or with another verb element, the combination of all the verb elements is designated as the predicate. The vertical interengagement of element 22, "our," with element 10, a noun element, indicates that element 22, an adjective element, modifies element 10.

"Car" as subject of the sentence is determined to be in the nominative case.

Figure 51:
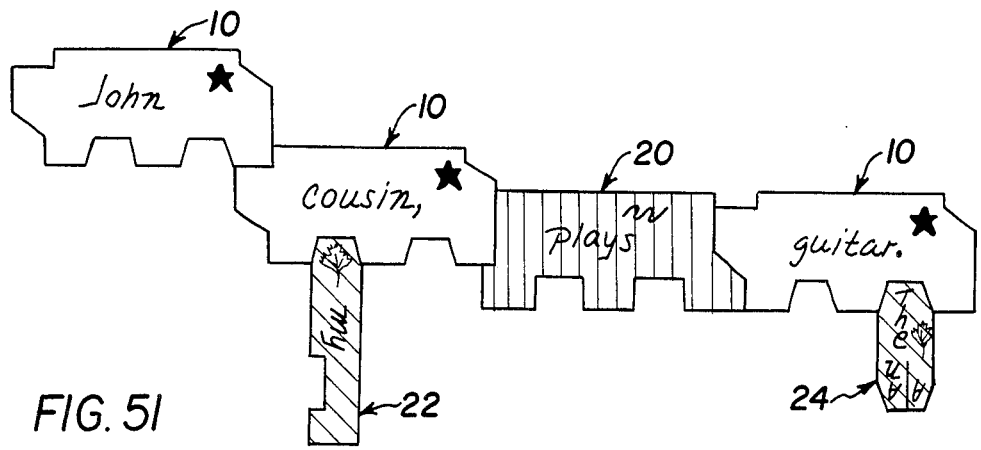

FIG. 51 shows the co-operation of individual elements to construct the sentence: "John, my cousin, plays the guitar." Element 10, "John," interengages on its lower right-hand edge with the upper left-hand edge of element 10, "cousin." This interengagement shows that "John" is the subject and "cousin" acts as an appositive to that noun. When a noun or noun-like element interengages in a slightly lower manner on its upper left-hand side, with another noun or noun-like element, it is always designated as a an appositive. The appositive, "cousin," interengages, in a slightly-elevated manner, on its right-hand side with the transitive verb, "plays." This interengagement indicates that "cousin" forms part of the subject, as does "John," and "plays" is the predicate. The interengagement of element 10, "guitar," with the right-hand side of element 20, the verb, indicates that "guitar" is the direct object of the sentence. The article represented by element 24, interengages vertically with noun element 10, "guitar," indicating that it modifies that word. "John," and "cousin" as the subject, are in the nominative case, while "guitar," as the direct object, is in the objective case.

Figure 52:
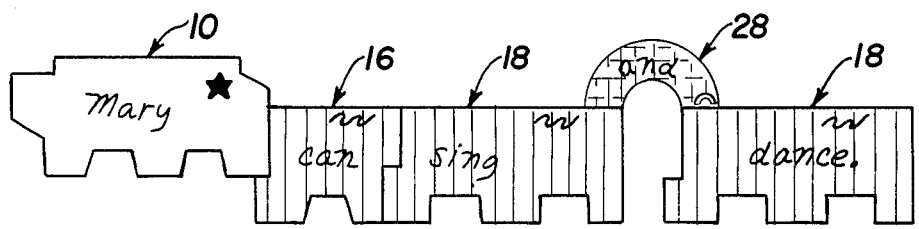

FIG. 52 shows the co-operation of individual elements to construct the sentence: "Mary can sing and dance." Element 10, "Mary," interengages in a slightly-elevated position with the left-hand side of element 16, representing the helping-verb, "can." This indicates that "Mary" acts as the subject and "can" is part of the predicate. Element 18, an intransitive verb, "sing," interengages on its right-hand side with the left-hand side of the helping verb "can." Element 28, representing a conjunction, "and," connects the verbs, "can sing," and "dance." This interengagement designates "can sing and dance" as the compound predicate of the sentence. Anytime verb elements following the subject of a sentence are joined by a co-ordinate conjunction element, all the verb elements together with the conjunction will be designated as a compound predicate. "Mary," as subject is in the nominative case.

Figure 53:
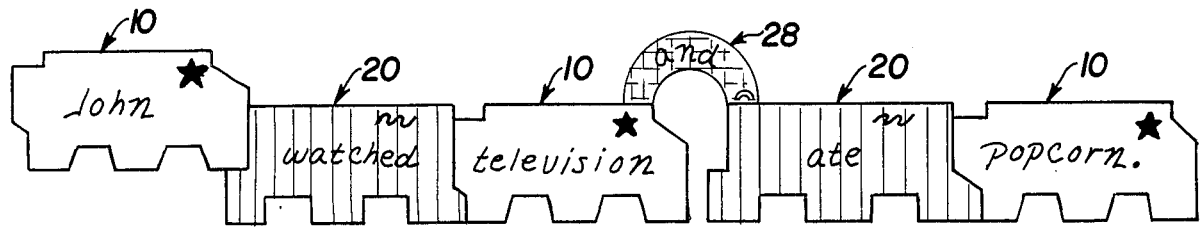

FIG. 53 shows the co-operation of individual elements to construct the sentence: "John watched television and ate popcorn." Element 10, "John," interengages in a slightly-elevated position with respect to element 20, the transitive verb, "watched," indicating that "John" is the subject and "watched" is part of the predicate. Element 10, "television," interengages on the right-hand side of the transitive verb, "watched" indicating that "television" functions as a direct object. Element 28, a co-ordinate conjunction, interengages with the direct object, "television," and the verb "ate" to link "ate" to the sentence as the second half of the compound predicate. The interengagement of element 10, "popcorn," on the right-hand side of the transitive verb "ate," indicates that "popcorn" is also a direct object in the sentence. "John," as subject is in the nominative case, while "popcorn" and "television," as direct objects, are in the objective case.

Figure 54:
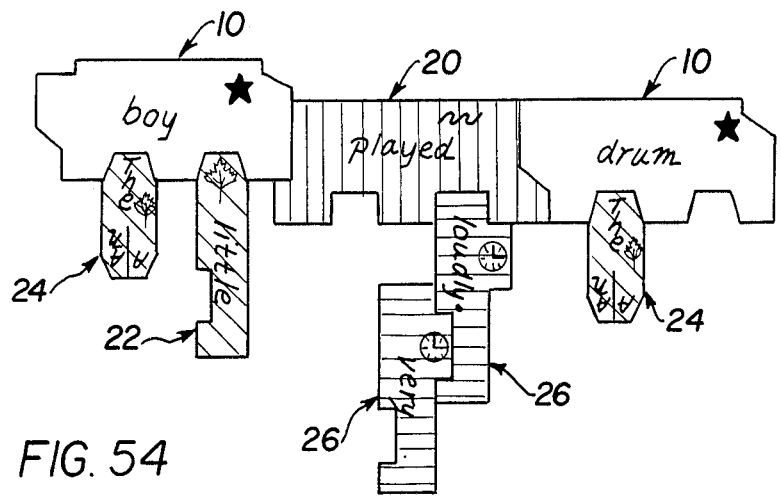

FIG. 54 shows the co-operation of individual elements to construct the sentence: "The little boy played the drum very loudly." Element 10, "boy," interengages in a slightly-elevated manner with the left-hand side of element 20, "played," indicating that "boy" is the subject and "played" is the predicate. Element 10, "drum," interengages on the right-hand side of element 20, a verb, indicating that it functions as the direct object of the sentence. Element 24, the article, interengages in a vertical column with element-10, indicating that it modifies the noun, "boy." Element 22, an adjective, interengages in a vertical column with element 10, indicating that "little" modifies "boy." Element 26, an adverb, "loudly," interengages in a vertical column with element 20, the verb, "played," indicating that "loudly" modifies the verb "played." Element 26, "very," interengages in a vertical column with the adverb, "loudly," indicating that "very," modifies the adverb, "loudly." Element 24, the article, interengages in a vertical column with the noun element, "drum," indicating that "the" modifies "drum." The noun, "boy," as subject, is determined to be in the nominative case while the noun, "drum," as direct object, is in the objective case.

Figure 55:
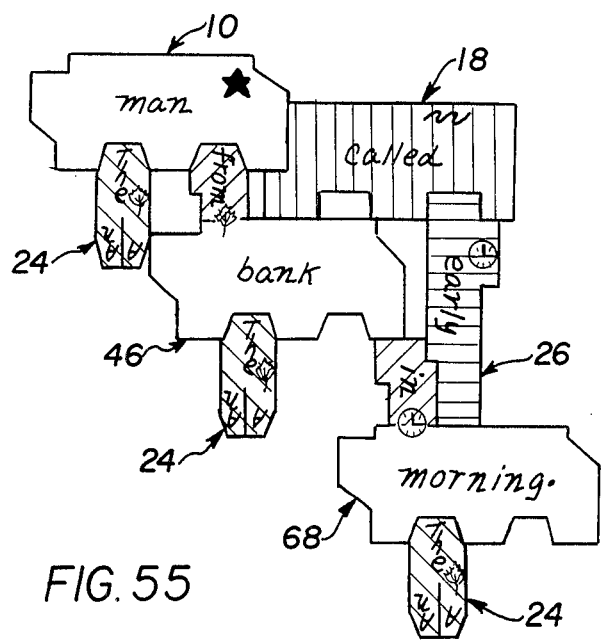

FIG. 55 shows the co-operation of individual elements to construct the sentence: "The man called from the bank early in the morning." Element 10, "man," interengages in a slightly-elevated manner with the left-hand side of element 18, which represents the intransitive verb, "called;" this indicates that "man" is the subject and "called" is the predicate of the sentence. Element 24, the article, interengages in a vertical position with the noun, "man," indicating that it modifies "man." The prepositional phrase, "from the bank," interengages in a vertical position with the noun, "man," indicating that the prepositional phrase acts to modify that noun. Element 26, "early," interengages in a vertical position with the intransitive verb, "called," indicating that "early" acts as an adverb to modify the verb, "called." The prepositional phrase, "in the morning," interengages on the left-hand lower side of element 26, the adverb, indicating that "in the morning" acts as an adverb, modifying the adverb, "early." The subject, "man," is in the nominative case; the noun "bank," as the object of the preposition "from," is in the objective case, and the noun, "morning," as the object of the preposition, "in," is in the objective case.

Figure 56:
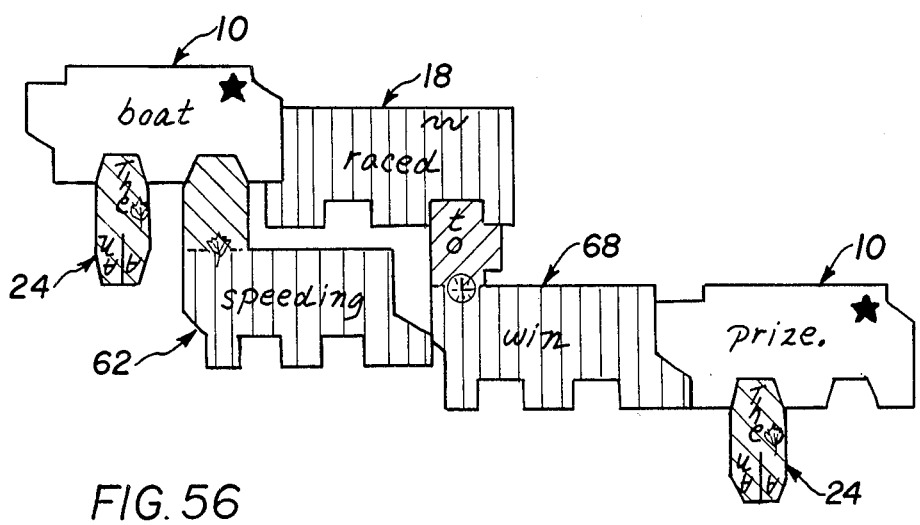

FIG. 56 shows how individual elements co-operate to form the sentence: "The speeding boat raced to win the prize." Element 10, "boat," interengages in a slightly-elevated position with the right-hand side of the intransitive verb, "raced," indicating that "boat" functions as the subject and "raced" functions as the predicate. Element 24, the article, interengages in a vertical position with the noun, "boat," indicating "the" modifies "boat." Element 62, the participle, "speeding," interengages in a vertical position with the noun, "boat," indicating that it acts as an adjective to modify the noun, "boat." Element 68, the infinitive, "to win," interengages in a vertical position with element 18, the verb, "raced," indicating that the adverbial phrase, "to win," acts to modify the verb, "raced." Element 10, the noun, "prize," interengages with the right-hand side of the verb-like hybrid infinitive form, "to win," indicating that the noun, "prize," is the object of the infinitive phrase, "to win." "Boat," as subject, is deteremined to be in the nominative case, while "prize," as the object of the infinitive, is deteremined to be in the objective case.

Figure 57:
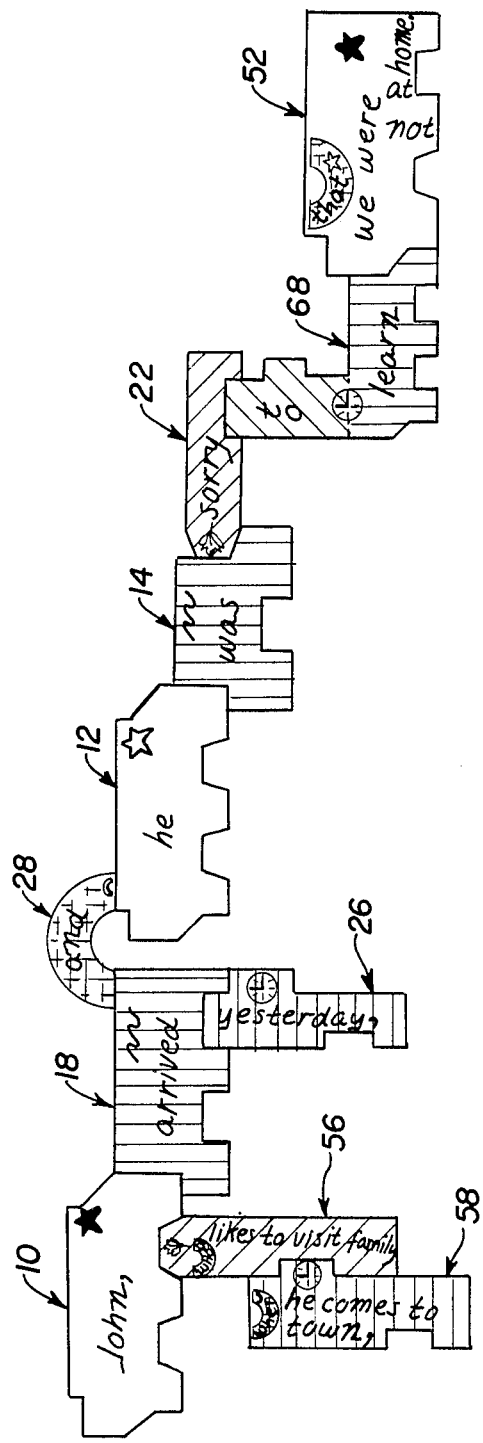

FIG. 57 shows how individual elements co-operate to construct the sentence: "John, who likes to vist my family when he comes to town, arrived yesterday; and he was sorry to learn that we were not at home." Element 10, "John," interengages in a slightly-elevated position with the left-hand side of element 18, the intransitive verb, "arrived," indicating that "John" is the subject and "arrived" is the predicate of the sentence. The adjective clause, "who likes to visit my family,"

interengages in a vertical position with the noun element, "John," indicating that it acts as a modifier of the noun, "John." The adverbial clause, "when he comes to town," interengages on the left-hand side of element 56, indicating that "when he comes to town," modifies the clause, "who likes to visit." The phrase represented by element 56 shows how a relative pronoun can act as a subordinate conjunction to introduce the phrase, "who likes to vist my family." Element 58, shows how a subordinate conjunction can act to introduce the adverbial clause, "when he comes to town," which modifies the adjective clause, "who likes to visit my family." Element 26, "yesterday," interengages in a vertical position with element 18, the verb, indicating that "yesterday," modifies the verb "arrived."

Element 28, the co-ordinate conjunction, "and," acts to join the two independent clauses of the sentence. Element 12, "he," is the subject of the second independent clause in the sentence. It interengages in a slightly-elevated position with respect to the linking verb, "was," indicating that "he" is the subject and "was" is the predicate of the second independent clause of the sentence. Element 22, "sorry," interengages in a horizontal position with the right-hand side of element 44, the verb, indicating that it acts as the predicate adjective. Element 68, the infinitive, "to learn," interengages in a vertical manner with element 22, the predicate adjective, to indicate that the infinitive phrase, "to learn," modifies the predicate adjective, "sorry." Element 52, the noun clause, "that we were not at home," interengages on the right hand side of the verb-like infinitive element 68. This indicates that the entire clause is the object of the infinitive phrase, "to learn." "John," and "he," as subjects are in the nominative case, while "learn" as the object of the infinitive "to," and the clause, "that we were not at home," as the object of the infinitive phrase, "to learn," are in the objective case.

RULES OF POSITIONAL ANALYSIS

One of the major advantages of the present invention is that, by grouping each of the thirty (30) elements of speech into ten (10) distinct sets, certain rules of grammatical construction become apparent. In other words, by analyzing the set, as well as the sequence and manner of interengagement between elements, it is possible to identify that element's sentence part within any given sentence.

SET ONE

1. Appositive: When an element in Set One interengages on its left-hand side with another element of Set One, or a gerund or infinitive element of Set Ten, in a horizontal column, but in a slightly-lowered manner, it is indicated as an appositive of the Set One element which preceeds it.

2. Subject: When an element from Set One interengages on its right-hand side with a verb, it is indicated as the subject of the sentence.

3. Direct Object: When an element from Set One interengages in a horizontal column on its left-hand side with a transitive verb from Set Two, it is indicated as a direct object.

4. Indirect Object: When an element from Set One interengages on its upper left-hand side with a transitive verb element from Set Two, and also interengages on its upper right-hand edge with an element from Set One, in a horizontal column, but in a slightly-lowered manner, it is indicated as an indirect object.

5. Objective Complement: When an element from Set One interengages on its lower left-hand side with another element from Set One, or a gerund or noun infinitive from Set Ten, it is indicated as an objective complement.

6. Predicate Nominative: When an element of Set One interengages on its left-hand side in a horizontal column with a linking verb element of Set Two, it is indicated as the predicate nominative.

7. Object of the Preposition: When an element from Set One interengages in a vertical column with an element from Set Seven, it is indicated as the object of the preposition.

8. Gerund Complement: When an element from Set One interengages on its left-hand side with a gerund element from Set Ten, in a horizontal column, it is indicated as the object of the gerund.

9. Participle Complement: When an element from Set One interengages on its left-hand side in a horizontal column with a participle element from Set Ten, it is indicated as the object of the participle.

10. Infinitive Complement: When an element from Set One interengages on its left-hand side in a horizontal column with any of the three infinitive elements of Set Ten, it is indicated as the object of the infinitive.

11. Subject of the Infinitive: When an element from Set One interengages on its right-hand side with a noun infinitive element from Set Ten, in a predominantely horizontal column, but in a slightly-elevated manner, it is indicated as the subject of the infinitive.

SET TWO

1. Predicate: When an element from Set Two interengages on its left-hand side in a predominantly horizontal column with an element from Set One, and is positioned lower than the first element, it is indicated as the predicate or part of the predicate in the clause or sentence in which it appears.

When an element from Set Two interengages on its left-hand side with a helping verb element of Set Two, it is indicated as a part of the predicate in the clause or sentence in which it appears.

SET THREE

1. Modifier: When an element from Set Three interengages in a vertical column with an element from Set One, Set Eight, or with either a gerund or noun infinitive element from Set Ten, it functions in the phrase, clause, or sentence as a modifier.

2. Predicate Adjective: When the adjective element of Set Three interengages in a horizontal column with the right-hand side of a linking verb element of Set Two, it is indicated as a predicate adjective.

SET FOUR

1. Modifier: When the adverb element of Set Four interengages in a vertical column with the adjective element in Set Three and with any of the elements in Sets Two, Four, Eight, and Ten, it is indicated as a modifier in the phrase, clause, or sentence in which it appears.

SET SEVEN

1. Modifier: When an adjective preposition interengages in a vertical column with an element from Set One, Set Eight, or a gerund element or noun infinitive element from Set Ten, it is indicated as a modifier.

When an adverb preposition interengages in a vertical column with an element from Set Two, Set Four, Set Ten, or with the adjective element from set Three, it is indicated as a modifier in the phrase, clause or sentence in which it appears.

SET EIGHT

1. Modifier: When the adjective prepositional phrase element of Set Eight interengages in a vertical column with an element from Set One, Set Eight, or with a gerund or noun infinitive element of Set Ten, it is indicated as a modifier.

When Set Eight's adverb prepositional phrase element interengages in a vertical column with an element from Set Two, Set Four, Set Ten, and with the adjective element of Set Three, it is indicated as a modifier in the phrase, clause or sentence in which it appears.

SET NINE

1. Subejct: When the noun clause element from Set Nine interengages on its right-hand side in a horizontal column with an element from Set Two, it is indicated as the subject of the clause or sentence in which it appears.

2. Direct Object: When the noun clause element form Set Nine interengages on its left-hand side with a transitive verb element from Set Two, it is indicated as the direct object of the phrase, clause, or sentence in which it appears.

3. Predicate Nominative: When the noun clause element interengages on its left-hand side in a horizontal column with a linking verb element from Set Two, it is indicated as a predicate nominative in the phrase, clause, or sentence in which it appears.

4. Object of preposition: When the noun clause element interengages in a vertical column with an element in Set Seven, the noun clause element is indicated as the object of the preposition.

5. Gerund Complement: When the noun clause element interengages on its left-hand side in a horizontal column with the gerund element of Set Ten, the noun clause element is indicated as the gerund complement.

6. Infinitive Complement: When the noun clause element interengages on its left-hand side with any of the infinitive elements of Set Ten, the noun clause element is indicated as the infinitive complement.

7. Participial Complement: When the noun clause element interengages on its left-hand side with the participle element of Set Ten, the noun clause element is indicated as the participial complement.

8. Modifier: When the adjective clause element interengages in a vertical column with elements in Set One, the noun clause element of Set Nine, a phrase element of Set Eight, or with the gerund or noun infinitive element of Set Ten, the adjective clause element is indicated as a modifier.

9. Predicate Adjective: When the adjective clause interengages in a horizontal column with the right-hand side of a linking verb, it is indicated as the predicate adjective of the linking verb in the phrase, clause or sentence in which it appears.

10. Modifier: When the adverb clause element interengages in a vertical column with an element from Set Two, Set Four, Set Ten, with the adjective elements of Set Nine, the adverb clause is indicated as a modifier of the phrase, clause or sentence in which it appears.

SET TEN

1. Subject: When the gerund or the noun infinitive element interengages on its right-hand side in a horizontal column with an element from Set Two, the gerund or noun infinitive element is indicated as the subject of the phrase, clause or sentence in which it appears.

2. Direct Object: When the gerund or noun infinitive element interengages on its left-hand side in a horizontal column with a transitive verb element from Set Two, the gerund or noun infinitive element is indicated as the direct object of the clause or sentence in which it appears.

3. Predicate Nominative: When the gerund or noun infinitive element interengages on its left-hand side in a horizontal column with a linking verb from Set Two, the gerund or noun infinitive element is indicated as the predicate nominative of the phrase, clause or sentence in which it appears.

4. Object of the Preposition: When the gerund or noun infinitive element interengages in a vertical column with an element from Set Seven, the gerund or noun infinitive element is indicated as the object of the preposition in the phrase, clause, or sentence in which it appears.

5. Gerund Complement: When a noun infinitive interengages on its left-hand side in a horizontal column with a gerund element, the noun infinitive is indicated as a gerund complement.

6. Infinitive Complement: When a gerund element interengages on its left-hand side in a horizontal column with an infinitive element, it is indicated as the infinitive complement.

7. Participial Complement: When a noun infinitive interengages on its left-hand side in a horizontal column with a participle, the noun infinitive is indicated as the participial complement.

8. Modifier: When the participle element interengages in a vertical column with elements from Set One, Set Eight, or the gerund or noun infinitive element in Set Ten, the participle element is indicated as a modifier.

When the adjective infinitive element interengages in a vertical column with the elements from Set One, Set Eight, or the gerund or noun infinitive element in Set Ten, the adjective infinitive element is indicated as a modifier.

When the adverb infinitive element interengages in a vertical column with elements in Set Two, the adjective element in Set Three, the adverb element in Set Four, or with any of the elements in its own set, it is indicated as a modifier.

What is claimed is:

1. An educational model for teaching language grammar, parts of speech, syntax, and sentence structure comprising a plurality of sets of independent elements, wherein:
   a. each set of independent elements is identified and distinguished from other sets by a designated color scheme common to each element of a set;
   b. each independent element within a set represents a word or group of words;
   c. each independent element within a set is adapted to be interengaged proximately with at least one other element in order to construct at least one of a phrase, clause, and sentence;
   d. each independent element within a set is distinguishable by the presence of a symbol thereon which indicates said element's function as a part of speech;

e. each independent element within a set has a designated shape which indicates said element's relationship to other parts of speech; and f. each independent element within a set can be proximately interengaged with other elements to show the case and part of sentence of each element within a sentence.

2. An educational system according to claim 1, further comprising:

a. a first set, comprised of two elements, a noun and a pronoun, both elements identified by a first color scheme;

b. a second set, comprised of four elements, representing a transitive verb, an intransitive verb, a linking verb, and a helping verb, said elements identified by a second color scheme;

c. a third set, comprised of two elements, an adjective and an article of speech, said elements identified by a third color scheme;

d. a fourth set, comprised of one element, an adverb, identified by a fourth color scheme;

e. a fifth set comprised of five elements, a co-ordinate conjunction, two corresponding correlative conjunctions, a subordinate conjunction, and a relative pronoun, said elements identified by a fifth color scheme;

f. a sixth set comprised of two elements, an interjection and an independent element, said elements identified by a sixth color scheme;

g. a seventh set comprised of two elements, a preposition functioning as an adverb and a preposition functioning as an adjective, said elements identified by a seventh color scheme;

h. an eighth set comprised of two elements, a prepositional phrase acting as an adjective and a prepositional phrase acting as an adverb, said elements identified by an eighth color scheme;

i. a ninth set, comprised of five elements, a noun clause being introduced by a subordinate conjunction, a noun clause being introduced by a relative pronoun, an adjective clause being introduced by a subordinate conjunction, and adjective clause being introduced by a relative pronoun, and an adverb clause being introduced by a subordinate conjunction, said elements identified by a ninth color scheme; and j. tenth set, comprised of five elements, a gerund, a participle, a noun infinitive, an adjective infinitive, and an adverb infinitive, said elements identified by a tenth color scheme.

3. An educational system according to claim 1, wherein each element bears at least one symbol thereon selected from one of eight distinct symbols, wherein:

a. a first designated symbol indicates that each element bearing its indicia functions as a noun;

b. a second designated symbol indicates that each element bearing its indicia functions as a pronoun;

c. a third designated symbol indicates that each element bearing its indicia functions as a verb;

d. a fourth designated symbol indicates that each element bearing its indicia funcitons as an adjective;

e. a fifth designated symbol indicates that each element bearing its indicia functions as an adverb;

f. a sixth designated symbol indicates that each element bearing its indicia functions as a conjunction;

g. a seventh designated symbol indicates that each element bearing its indicia functions as an interjection; and h. an eighth designated symbol indicates that each element bearing its indicia functions as a preposition.

4. An educational system according to claim 2, wherein each single independent element of Set Ten includes a plurality of colors in its color scheme, one of which color is always said second color scheme, indicating that each element therein is a hybrid part of speech known as a verbal, selected from the group consisting of a gerund, a participle, an adjective infinitive, a noun infinitive, and an adverb infinitive.

5. An educational system according to claim 2, wherein each single element of Set Eight contains at least two colors in its said eighth color scheme, one of which is always said seventh color scheme and the other of which is always said first color scheme indicating said element is identified as being at least one of an adjective prepositional phrase and an adverbial prepositional phrase.

6. An educational system according to claim 2, wherein each single independent element of Set Nine, has a plurality of colors in its color scheme, one color always being said fifth color scheme, and having a plurality of symbols thereon, which indicates each element is a clause, selected from the group consisting of a noun clause being introduced by a subordinate conjunction, a noun clause being introduced by a relative pronoun, an adjective clause being introduced by a subordinate conjunction, an adjective clause being introduced by a relative pronoun, and an adverbial clause being introduced by a subordinate conjunction.

* * * * *